United States Patent [19]
Mayer et al.

[11] Patent Number: 5,358,802
[45] Date of Patent: Oct. 25, 1994

[54] DOPING OF CARBON FOAMS FOR USE IN ENERGY STORAGE DEVICES

[75] Inventors: Steven T. Mayer, San Leandro; Richard W. Pekala, Pleasant Hill; Robert L. Morrison, Modesto; James L. Kaschmitter, Pleasanton, all of Calif.

[73] Assignee: Regents of the University of California, Oakland, Calif.

[21] Appl. No.: 41,507

[22] Filed: Apr. 1, 1993

[51] Int. Cl.⁵ .............................................. H01M 4/36
[52] U.S. Cl. ................................... 429/218; 252/502; 423/445 R
[58] Field of Search ..................... 429/218; 423/445; 252/502

[56] References Cited

U.S. PATENT DOCUMENTS

| | | | |
|---|---|---|---|
| 4,133,738 | 1/1979 | Will | 204/294 |
| 4,582,575 | 4/1986 | Warren et al. | 204/12 |
| 4,617,228 | 10/1986 | Newman et al. | 428/265 |
| 4,626,612 | 12/1986 | Brotz | 136/224 |
| 4,668,595 | 5/1987 | Yoshino et al. | 429/194 |
| 4,692,225 | 9/1987 | Witucki et al. | 204/59 |
| 4,696,835 | 9/1987 | Maus et al. | 427/121 |
| 4,756,898 | 7/1988 | Hopper et al. | 423/449 |
| 4,832,870 | 5/1989 | Clough et al. | 252/511 |
| 4,832,881 | 5/1989 | Arnold, Jr. et al. | 264/29.7 |
| 4,873,218 | 10/1989 | Pekala | 502/418 |
| 4,992,254 | 2/1991 | Kong | 423/445 X |
| 4,997,804 | 3/1991 | Pekala | 502/418 |
| 4,999,385 | 3/1991 | McCullough et al. | 252/502 X |
| 5,093,216 | 3/1992 | Azuma et al. | 429/218 |

Primary Examiner—Stephen Kalafut
Attorney, Agent, or Firm—Henry P. Sartorio; L. E. Carnahan

[57] ABSTRACT

A polymeric foam precursor, wetted with phosphoric acid, is pyrolyzed in an inert atmosphere to produce an open-cell doped carbon foam, which is utilized as a lithium intercalation anode in a secondary, organic electrolyte battery. Tests were conducted in a cell containing an organic electrolyte and using lithium metal counter and reference electrodes, with the anode located therebetween. Results after charge and discharge cycling, for a total of 6 cycles, indicated a substantial increase in the energy storage capability of the phosphorus doped carbon foam relative to the undoped carbon foam, when used as a rechargeable lithium ion battery.

35 Claims, 2 Drawing Sheets

DOPING OF CARBON FOAMS FOR USE IN ENERGY STORAGE DEVICES

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to carbonaceous material for use in energy storage devices, specifically to the use of doped carbon foam for use in such devices, and more specifically to phosphorus (P) doped carbon foams for use, for example, as a lithium intercalation anode in a rechargeable lithium ion battery, or as an electrode in a supercapacitor. Doping in the context of this patent refers to donor or acceptor dopants, as opposed to intercalate doping, as occurs with intercalation of lithium ions into carbon.

As the result of the recent trend toward miniaturization of electronic components and the recognized benefits of rechargeable energy storage devices, substantial effort has been directed toward the development of small rechargeable cells such as the non-aqueous electrolyte lithium cell. In recent times, rechargeable lithium cells of various types have been extensively studied for practical utilization. However, rechargeable, nonaqueous electrolyte cells with lithium metal negative electrodes have had the disadvantages of long charging times, poor quick charging properties, short cycle life and serious safety problems due to uneven electroplating of lithium metal during cycling.

More recently, several groups have developed rechargeable battery systems based on lithium intercalation to address many of the problems inherent in lithium metal batteries. Although the lithium ion system has a lower theoretically achievable energy density, it is inherently a safer and more rechargeable system due to the different energy storage mechanism. One solution is exemplified by U.S. Pat. No. 4,668,595 issued May 26, 1987 to A. Yoshino et al., which discloses the doping in a wide variety of carbons, formed from carbon powders, carbon blacks and carbonized polymeric fibers.

Another approach has been the incorporation of phosphorus in carbonized materials such as resins, certain hydrocarbons and some polymeric compounds from furfuryl alcohol precursors, as exemplified by U.S. Pat. No. 5,093,216 issued Mar. 3, 1992 to H. Azuma et al. In these instances there has been seen intercalation of lithium in amounts higher than that which can be the theoretical limit ($LiC_6$), and this can lead to substantially higher energy densities then those previously achieved, when incorporated in a lithium ion battery.

The above described prior art rely primarily on the use of carbon electrodes which have been formed by pressing carbon powders with binder to form a solid carbon electrode. Related embodiments may rely on carbonization and compaction of fibers, cellulose, etc. These are distinct from the present invention, which utilizes monolithic, open-cell carbon foams as electrodes. Carbon foams have distinct advantages for use in energy storage systems, including easily controllable porosity and density, and high conductivity and strength. The morphology of the material may also be controlled by varying the pre-cursor fabrication conditions. This may include fabrication of foams in microspheres of varying morphology.

In recent years, various types of carbon foams have been fabricated, including low-density carbon foams such as exemplified by U.S. Pat. No. 4,873,218 issued Oct. 10, 1989 and U.S. Pat. No. 4,997,804 issued Mar. 5, 1991, each to R. W. Pekala. These carbon foams have a density of $\leq 100$ mg/cc and cell size of $\leq 0.1$ microns. This concept has been further extended, by the present inventors, to higher density foams (0.1 to 1.0 gm/cm) described and claimed in U.S. patent application Ser. No. 07/822,438 filed Jan. 17, 1992, now U.S. Pat. No. 5,260,855, issued Nov. 9, 1993. Also, more recently, the concept has been developed of loading carbon foams with different types of materials, depending on the application, but this loading of carbon foams did not modify the localized structure to change the characteristics of the foam, as would doping of these foams with a selected material. In doping, materials would be distributed and bonded into the carbon matrix on a molecular level.

While the doping of a carbonized material, as in above-referenced U.S. Pat. No. 5,093,216, has provided increased energy densities, doped carbon foams, as an anode, can provide higher energy and power densities, due to the improved electronic conductivity which results from their monolithic structure. This reduces, or eliminates the requirement for a metallic current collector, thereby reducing the weight of the packaged battery. Dopant species can be incorporated into the carbon as substitutional atoms (dopants), during the polymerization and pyrolysis of the material. The resulting carbon material, of unspecified form (foam, foam microspheres or other), differs in its electrochemical characteristics from a pure carbon sample. These differences can affect 1) the voltage at which lithium is electrochemically intercalated into the carbon, 2) the capacity of the carbon for intercalation lithium, 3) the charging or discharging rate of lithium intercalation, 4) the cycleability of the device, and 5) the reversibility of the intercalation process.

It has been recognized by the present inventors that doping carbon foams with selected materials ("dopants" P, B, As and Sb) will modify the localized graphitic structure to improve intercalation characteristics (i.e. $d_{002}$ plane spacing), and thus provide increased intercalation of lithium ions and hence improve the potential energy density when used as an electrode in a rechargeable battery. Thus, this recognition by the inventors provides a method by which the energy storage capacity per unit weight in lithium cells, for example, could be increased by incorporating the dopants into the carbon foams and thereby produce the increased densities provided by above-referenced U.S. Pat. No. 5,093,216 while reducing the weight of the cell. Therefore, the present invention fills a need in the field of miniaturized nonaqueous electrolytic cells, while providing the needed high energy density.

SUMMARY OF THE INVENTION

It is an object of the present invention to provide doped carbonaceous materials for use in energy storage devices, including batteries, fuel cells and capacitors.

Another object of the invention is to provide carbon foams and/or aerogels derived from resorcinol/formaldehyde, phloroglucinol/formaldehyde, catechol/-formaldehyde, polyacrylonitrile (PAN), polymethylacrylonitride (PMAN), divinyl benzene (DVB), polyfurfuryl alcohol, polyfurfural, phenolic resins, and combinations of these materials as precursors, which are pyrolized and doped with phosphorus, boron, antimony, and/or arsenic for use in energy storage devices.

Another object of the invention is to provide a doped carbon foam in an electrode of a lithium ion rechargeable cell.

Another object of the invention is to increase the capacity and energy per unit weight and volume in rechargeable cells by utilizing doped carbon foams as a lithium intercalation electrode in a non-aqueous electrolytic cell.

Another object of the invention is to improve the rechargeability and cycle life by utilizing doped carbon foams as a lithium intercalation electrode in a non-aqueous electrolytic cell.

Other objects and advantages of the present invention will become apparent from the following description and accompanying drawings. The invention basically involves doping carbon foams with selected materials, such as phosphorus, and using the doped carbon foam as a lithium intercalation electrode, for example, in a rechargeable energy storage device using an organic electrolyte. More specifically, and by way of example only, a resorcinol/formaldehyde (RF) aerogel foam is wetted with phosphoric acid/methanol solution, dried, and then pyrolyzed in a nitrogen atmosphere, and the resulting doped carbon aerogel foam was, for testing purposes, utilized as a lithium intercalation anode in a cell wherein the organic electrolyte was a mixture of proplyene carbonate and lithium perchlorate.

BRIEF DESCRIPTION OF THE DRAWINGS

The accompanying drawings, which are incorporated into and form a part of the disclosure, illustrate a test cell and test data for the invention and, together with the description, serve to explain the principles of the invention.

DETAILED DESCRIPTION OF THE INVENTION

Figure 1:
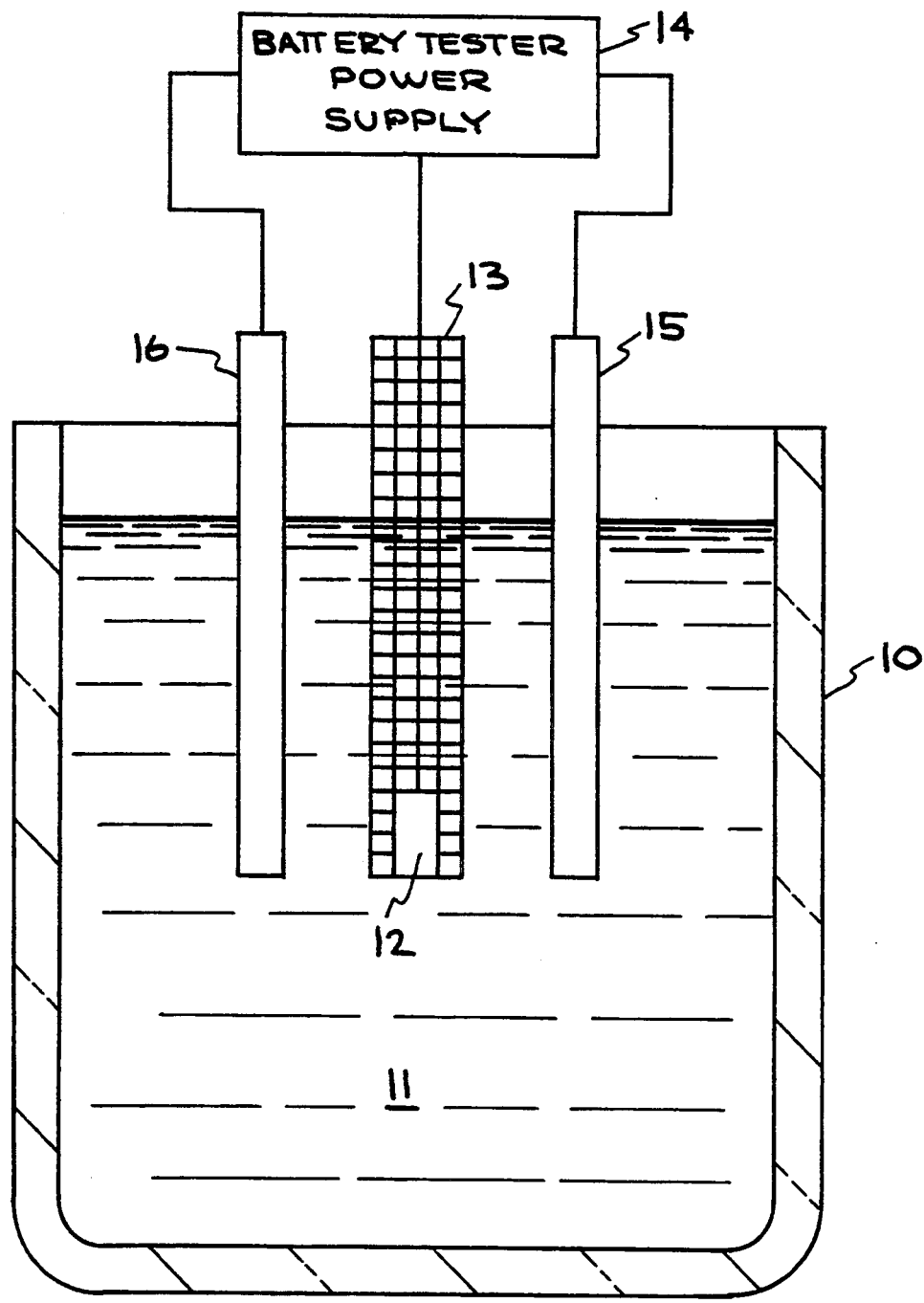
FIG. 1 is a schematic illustration of a test cell used to verify the advantages provided by using a doped carbon foam in a rechargeable cell.

Carbon aerogels and carbon foams are known in the art. Doping of carbonaceous materials with phosphorus or other dopants for use in a nonaqueous electrolyte cell is known in the art, as referenced above. Doped carbon foams are different than loaded carbon foams, in that doping involves the distribution and bonding of the added species into the carbon matrix on a molecular level. Doping can be used to accomplish a variety of effects, depending on the materials used, and the method of incorporation.

The present invention is based on the recognition that the use of dopant in carbon foams and carbonaceous materials can have the effect of modifying the localized graphitic structure to improve intercalation characteristics (e.g. $d_{002}$ plane spacing), and that selected dopants can interact to alter the binding energy for intercalated lithium and hence improve the potential energy density when used as an electrode in a rechargeable battery. It was also recognized that donor or acceptor dopants may also be incorporated into the carbonaceous material in a manner somewhat analogous to silicon. Typical donor materials are nonmetals residing in the IIIA group of the periodic table, such as boron, aluminum, gallium, indium and thallium and typical acceptor materials are from the VA group of the table, such as phosphorus, arsenic, antimony, and bismuth. As is well known, donors have a loosely bonded electron in the outer shell, which is easily given up, while acceptors have an incomplete other shell which can easily pick up an electron. It was recognized that the potential effect of introducing selected dopants into carbon foams was substantial, in that it can result in substantially higher energy densities ($>100$ W·hr/kg) and cycle lifes than those presently achieved, when incorporated in a lithium ion battery.

In a first reduction to practice of the present intention, a carbon foam was synthesized from polyacrylonitrile (PAN) precursors. Approximately 4% (3–16%) polyacrylonitrile (PAN) was dissolved in dimethyl sulfoxide (DMSO) +3% water. Other solvents may be used, including dimethylformamide (DMF), maleic anhydride, propylene carbonate, dimethylacetamide, etc. Very finely divided carbon powder (see below) is added to this solution, in an appropriate amount consistent with the desired density of the finished carbon. This mixture is then frozen, with the freezing temperature selected, depending on desired material characteristics, ranging from $-5°$ C. to $-150°$ C. The frozen solution of polymer and/or carbon containing slurry is then freeze dried at $-6°$ C. (within a range of plus or minus $15°$ C.) with a pressure ramping from approximately 300 milliTorr to 0 milliTorr. The freeze-dried material is then fired in either a vacuum furnace or a furnace with an inert atmosphere at approximately $1050°$ C. Firing can be performed over a wide range of temperatures ($500°–2500°$ C.), influencing final carbon composition and atomic structure. Openly porous carbon can be produced by this method up to densities of approximately 0.6 g/cc. Higher densities are produceable by this method, but with possible corresponding decrease in porosity.

The carbon powder, which is added to the polyacrylonitrile/ dimethyl sulfoxide solution described above, is produced by dissolving approximately 4–5% PAN in the same solution as above, followed by freezing and freeze drying. This material is then fired at approximately $1050°$ C. Firing can be performed over a wide range of temperatures ($500°$ to $2500°$ C.), influencing final carbon composition. The resultant carbon is then crushed and sieved and used as stated above. Although the carbon powder made by this method is a preferred embodiment, any type of carbon powder could be added at this step. Powders with the correct atomic structure and morphology will provide better results. Alternative carbons which may be used include carbons formed from polymethylacrylonitrile (PMAN), resorcinol/formaldehyde, catechol/formaldehyde, phenol/formaldehyde, etc., or mixtures thereof.

A variant of the above described doped PAN can be produced by the above described process by using doped polymethylacrylonitrile (PMAN) as an alternative precursor, to be mixed into a solvent solution prior to foam preparation.

By utilizing the following variables: PAN concentrations, (or other polymers), carbon particle size, amount of activation, firing temperatures, and phosphoric acid treatment described subsequently, a doped carbon foam with a wide range of intercalation levels, capacity, and cycle characteristics can be produced.

PAN foams are routinely converted into carbon foams by pyrolysis at ~1000° C. in an inert atmosphere. The resultant carbon foams have been utilized as anodes in lithium-ion batteries. Under appropriate conditions, lithium will intercalate into the carbon foam structure in a fashion similar to graphite, where a composition of $LiC_6$ can be achieved. Thus far, undoped carbon foams derived from polyacrylonitrile have shown intercalation on the order of 50% of the theoretical value with relatively poor cycle life.

In this invention, we demonstrate that both the level of intercalation and cycle life can be improved by doping the PAN foam prior to pyrolysis. In particular, the void volume of an uncarbonized PAN foam ($\rho = 0.10$ g/cc) is filled with a phosphoric acid/methanol solution (0.35g $H_3PO_4$ per 40 ml MeOH). The uncarbonized PAN foam is allowed to stand in this solution overnight to achieve an equilibrium distribution of the phosphoric acid. Next, the uncarbonized PAN foam is removed from the solution and the methanol is allowed to evaporate, leaving behind a thin coating of phosphoric acid throughout the PAN foam. The phosphoric acid-coated uncarbonized PAN foam is then placed in a tube furnace and pyrolyzed at 1050 ° C. under nitrogen flow. The resultant phosphorus-doped carbon foam shows enhanced intercalation, reduced surface formatting and longer cycle life than the undoped foam.

Figure 3:
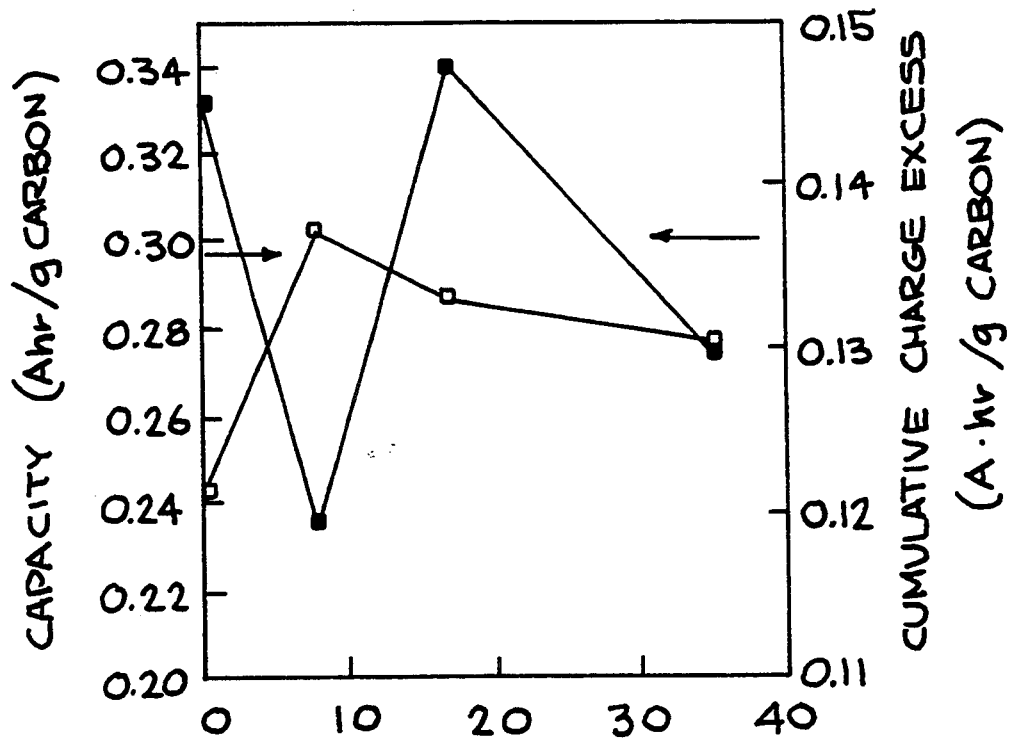
FIG. 3 is a plot showing the effect of phosphorus doping in a carbon (PAN) foam.

FIG. 3 is a plot of charge capacity and cumulative charge excess versus the amount of phosphorus doping in a carbon PAN foam sample. The total charge capacity of the carbon foam increases from 0.24 A·hr/g for undoped carbon foam to a maximum of 0.33 A·hr/g of doped carbon foam. Also significant is the cumulative charge excess averaged over the first four cycles. This is minimal for doping of 10 g of phosphoric acid/100 cc methanol, particularly when compared to the total capacity. Low cumulative charge excess indicates that minimal surface formatting has occurred during the initial cycling of the cell. While phosphorus is the preferred dopant, other Group VB elements (e.g. As, Sb) may enhance related performance characteristics.

A second reduction to practice of the present invention consisted of doping resorcinol/formaldehyde (RF) aerogel foam with phosphorus. The RF aerogel foam, as described and claimed in coinventor R. W. Pekala's above-referenced U.S. Pat. No. 4,873,218 and U.S. Pat. No. 4,873,218, which are incorporated herein by reference thereto, provide a carbon foam having a density of about 100 mg/cc and cell size of less than 0.1 micron. Basically, the process was carried out by wetting the organic (RF) foam with phosphoric acid ($H_3PO_4$) and then pyrolyzing in a nitrogen atmosphere at 500° C. for five (5) hours, and then at 1050° C. for one (1) hour.

The following sets forth a specific sequence of operational steps for producing an electrode, such as an anode, from phosphorus doped RF carbon foam:

1. Synthesize a resorcinol-formaldehyde foam having a density of 0.4 g/cc in accordance with above-referenced U.S. Pat. No. 4,873,218 and U.S. Pat. No. 4,997,804.

2. Dilute concentrated phosphoric acid (86%) with methanol to form an alcoholic solution containing 8.6% w/v ($H_3PO_4$).

3. Wick the $H_3PO_4$/methanol solution into the RF foam and then slowly evaporate the methanol. This procedure deposits approximately 0.06 g of $H_3PO_4$ per gram of RF foam.

4. The $H_3PO_4$/RF foam is then placed inside a tube furnace and pyrolyzed in a nitrogen atmosphere for 5 hours @ 500° C., followed by 1 hour at 1050° C.

5. The resultant carbon foam is phosphorus doped throughout its structure.

6. Mount the thus formed phosphorus doped carbon foam electrode as an anode in a rechargeable lithium cell.

The resulting doped carbon aerogel was then prepared for testing in an inert argon atmosphere glove box as a lithium intercalation anode. The tests were carried out in a test cell illustrated in FIG. 1 and which comprises a cell housing 10 containing an electrolyte 11 composed of a mixture of propylene carbonate (PC) and lithium perchlorate (LiC104). The phosphorus doped carbon foam anode 12 is located in the electrolyte 11 and is secured in a nickel mesh current collector 13 which is electrically connected as shown to a battery tester power supply 14. A counter electrode 15 and a reference electrode 16 made of sheets of lithium metal are located on opposite sides of anode 12 and electrically connected as shown to battery tester power supply 14. In the illustrated test cell the electrolyte 11 mixture of PC and $LiClO_4$ was formed by 1M $LiClO_4$ in 75ml of PC. However, other appropriate electrolytes and electrolytes with salts may be utilized, including electrolytes with Lithium (Bis) Trifluoromethanesulfonimide.

Figure 2:
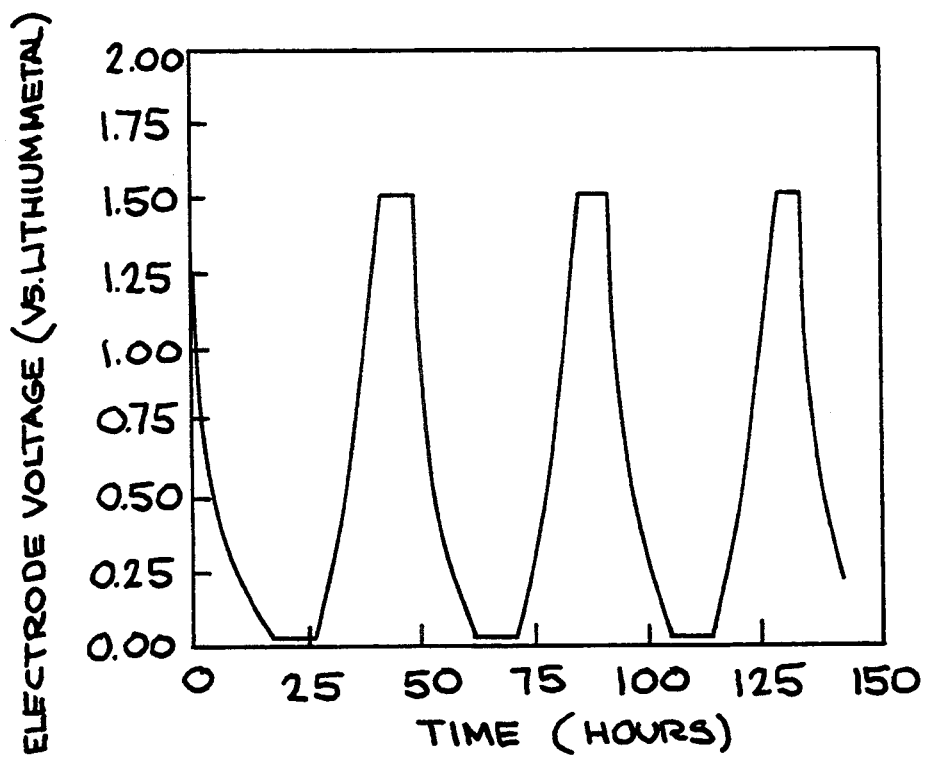
FIG. 2 is a graph illustrating the cycling of the carbon anode of the test cell of FIG. 1.

The test cell was charged and discharged (cycled), as shown in FIG. 2, for a total of six (6) cycles. The carbon anode was charged at 1.3 mA to 5 mV and held at 5 mV for 10 hours. It was then discharged at 1.3 mA to 1.5 Volts and held at 1.5 Volts for 6 hours. Evaluation of these test results indicate an intercalation level of 75% of $LiC_6$ for the phosphorus doped PAN carbon foam when used as a rechargeable lithium ion battery.

While a detailed experiment involving phosphorus doped polyacrylonitrile (PAN) and resorcinol/formaldehyde carbon foams have been set forth above, parallel experiments were performed using other carbon foam precursors which also showed significant increases in energy storage capacity. These included polymethyacrylonitrile, phenol/formaldehyde, catechol formaldehyde and phenolic resins. Other carbons which could be used include emulsion derived foams and foams derived from polyfurfuryl alcohol. Thus, it has been established by this invention that phosphorus doped carbon forms if used as an enhanced intercalation anode or cathode in a lithium ion battery would provide improved energy density and thus increase the energy storage capability without increasing the weight of the battery.

While the above examples utilizes phosphorus (P) as the dopant, other dopants, such as boron (B), arsenic (As), and antimony (Sb), may be used. Also, specific parameters for carrying out the processes exemplifying this invention have been set forth, other parameters are within the scope of this invention. For example, the phosphoric acid wetted polymeric foam may be first pyrolyzed at a temperature in the range of 400°-600° C. for a time period of 1-24 hours, and then at a temperature in the range of 500°-2500° C. for about an hour. Also, the foam may be wetted using 3-15% phosphoric acid by weight. The polyacrylonitrile foam may be pyrolyzed at 500°-2500° C. in an inert atmosphere.

All of the above described carbon foams may be post-processed to enhance porosity by activating the carbon foam with etchants, which may include $CO_2$, steam and acids, including nitric acid. One potential disadvantage of activation for use in a battery is that it may increase the carbon surface area, hence increasing the amount of irreversible reaction that tends to occur during the first charge/discharge cycle. However, increased surface areas is desirable for use as a capacitor.

It has thus been shown that the present invention improves energy density and thus improves the energy storage capability of a rechargeable lithium ion battery by providing a doped carbon foam having a density in the range of 100–800 mg/cc which can be used as an enhanced intercalation anode in such a battery. While the dopant has been introduced prior to carbonization of the foam in the above examples, it is anticipated that the dopant can be introduced following or during the carbonization process.

While the description of the invention has been specifically directed to phosphorus doping of polyacrylonitrile (PAN) and resorcinol/formaldehyde carbon foams, such is not intended to limit the invention to the specific embodiments described, since, as pointed out above, other polymeric foams and/or aerogels may be doped with other "dopants", and may be utilized in accordance with the basic concept of this invention which involves doping of carbonaceous materials for use in energy storage devices. It is recognized that modifications and changes will become apparent to those skilled in the art, and thus the scope of the invention is to be limited only by the scope of the appended claims.

We claim:

1. In an energy storage device, the improvement comprising:
   an enhanced intercalation electrode which includes a carbon foam doped with material selected from the group consisting of phosphorus, boron, arsenic and antimony.

2. The energy storage device of claim 1, wherein the energy storage device comprises a lithium ion secondary battery.

3. The device of claim 1, wherein the enhanced intercalation electrode constitutes an anode.

4. The device of claim 1, wherein the carbon foam is selected from the group consisting of a doped carbonized foam derived from polyacrylonitrile (PAN) foam, polymethylacrylonitrile (PMAN) and resorcinol/formaldehyde aerogel foam.

5. The device of claim 4, wherein the material for doping the carbon foam is phosphorus.

6. The device of claim 1, wherein the carbon foam has a density of about 100–800 mg/cc and a cell size of less than 0.1 micron, and wherein the material for doping the carbon foam is phosphorus.

7. A method for producing a doped carbon foam for use as an enhanced intercalation electrode of a lithium ion battery, comprising the steps of:
   providing a quantity of polymeric foam;
   doping the polymeric foam with phosphorus; and
   pyrolyzing the foam to form a doped carbon foam.

8. The method of claim 7, wherein the steps of doping and pyrolyzing are carried out by:
   wetting the polymeric foam with phosphoric acid;
   pyrolyzing the wetted polymeric foam in a nitrogen atmosphere at a temperature in the range of 400°–600° C. for a time period in the range of 1–24 hours; and
   further pyrolyzing the carbon foam in a nitrogen atmosphere at a temperature in the range of 500°–2500° C. for about 1 hour.

9. The method of claim 8, wherein the step of pyrolyzing is carried out at a temperature of about 500° C., and the step of further pyrolyzing is carried out at a temperature of about 1100° C.

10. The method of claim 8, wherein the step of providing a quantity of polymeric foam is carried out by providing a resorcinol/formaldehyde aerogel foam.

11. The method of claim 10, wherein the step of wetting the foam with phosphoric acid is carried out by using 3–15% phosphoric acid by weight.

12. The method of claim 11, wherein the phosphoric acid is about 8.6% by weight.

13. The method of claim 7, wherein the step of providing the foam is carried out by providing a foam having a density of about 100–800 mg/cc and a cell size of about 0.1 micron.

14. The method of claim 7, wherein the step of providing a quantity of polymeric foam is carried out by producing a polyacrylonitrile polymeric foam, and wherein the step of doping the foam is carried out using a phosphoric acid/methanol solution.

15. The method of claim 14, wherein the step of producing a carbon foam from a polyacrylonitrile foam is carried out by pyrolysis of polyacrylonitrile foam at a temperature in the range of 500°–2500° C. in an inert atmosphere.

16. The method of claim 15, wherein the step of producing a polyacrylonitrile carbon foam is carried out by pyrolysis of polyacrylonitrile foam at about 1100° C. in an inert atmosphere.

17. The method of claim 16, wherein the step of doping the foam is carried out by the steps of:
   filling the void volume of the foam with a phosphoric acid/methanol solution;
   allowing the foam to stand in the solution for a period of time sufficient to achieve an equilibrium distribution of the phosphoric acid;
   removing the foam from the solution;
   evaporating the methanol from the foam thereby leaving a thin coating of phosphoric acid throughout the foam;
   pyrolyzing the thus coated foam at 1050° C. under a nitrogen flow;
   thereby producing a phosphorus-doped carbon foam.

18. A method for producing a doped carbon foam for use as an enhanced intercalation electrode of a lithium ion battery, including the steps of:
   providing a quantity of polymeric foam; and
   doping the foam with phosphorus prior to carbonization of the foam.

19. The method of claim 18, wherein the step of providing a quantity of polymeric foam is carried out by providing polyacrylonitrile (PAN) foam.

20. The method of claim 19, wherein the step of doping the polymeric foam is carried out by the steps of:
   filling the foam with a phosphoric acid/methanol solution;
   allowing the foam to stand in the solution a sufficient time to achieve an equilibrium distribution of the phosphoric acid;
   removing the foam from the solution;
   allowing the methanol to evaporate from the foam leaving a thin coating of phosphoric acid throughout the foam; and subjecting the phosphoric acid-coated foam to a temperature of 1050° C. under nitrogen flow;
thereby producing a phosphorus-doped foam.

21. The method of claim 20, additionally including the step of forming the phosphoric acid/methanol solution from 0.35 g $H_3PO_4$ per 40 ml MeOH.

22. A process for providing a porous carbon by synthesizing polyacrylonitrile foam, comprising the steps of:
dissolving polyacrylonitrile in a solvent selected from the group of dimethyl sulfoxide (DMSO), dimethylformamide (DMF), maleic anhydride, propylene carbonate, and dimethylacetamide, thereby forming a solution;
freezing the thus formed solution at a temperature in the range of $-5°$ C. to $-150°$ C.;
freeze drying the thus frozen solution at a pressure ramping from about 300 milliTorr to 0 milliTorr forming a material; and
firing the thus freeze dried material at about 1100° C. in a furnace using a vacuum or an inert atmosphere;
thereby producing a porous carbon foam.

23. The process of claim 22, wherein the solvent is dimethyl sulfoxide and the solution is formed by dissolving 3–16% polyacrylonitrile in the solvent plus 3% water.

24. The process of claim 23, wherein the step of freeze drying is carried out at a temperature of $-6°$ C. plus or minus 15° C.

25. The process of claim 24, additionally including the step of adding carbon powder to the dimethyl sulfoxide (DMSO) and polyacrylonitrile solution, thus producing porous carbon with a density of up to about 0.6 g/cc.

26. The process of claim 23, additionally including the step of forming the carbon powder by:
forming a solution by dissolving approximately 4–5% polyacrylonitrile in dimethyl sulfoxide;
freezing the solution;
freeze drying the thus frozen solution forming a material;
firing the freeze dried material at temperature of approximately 1100° C. and controlling the temperature for influencing the final carbon composition; and
crushing and sieving the resultant carbon to produce a carbon powder composition.

27. In a lithium ion battery having electrodes located in a nonaqueous electrolyte, the improvement comprising:
an electrode adapted to be located in the nonaqueous electrolyte and which includes a quantity of carbon foam doped with material selected from the group consisting of phosphorus, boron, arsenic, and antimony.

28. The device of claim 27, wherein said electrode which includes a quantity of doped carbon foam comprises an anode.

29. The device of claim 27, wherein said material of which said carbon foam is doped is phosphorus.

30. The device of claim 29, wherein said carbon foam is derived from the pyrolysis of polyacrylonitrile, resorcinol/formaldehyde aerogel or polymethylacrylonitrile.

31. The device of claim 27, wherein the quantity of carbon foam is composed of resorcinol/formaldehyde aerogel foam having a cell size of less than 0.1 microns, and wherein the foam is doped with phosphorus.

32. The device of claim 27, wherein the quantity of carbon foam is formed from a precursor selected from the group of resorcinol/formaldehyde, polyacrylonitrile, polymethyacrylonitrile, and phenolic resins.

33. A method for producing doped carbon foam, comprising the steps of:
providing a quantity of carbon foam derived from a precursor selected from the group consisting of resorcinol/formaldehyde, phloroglucinol/formaldehyde, catechol/formaldehyde, polyacrylonitrile, polymethylacrylonitrile, divinyl benzene, polyfurfuryl alcohol, polyfurfural and phenolic resins; and
doping the thus derived carbon foam with a dopant selected from the group consisting of phosphorus, boron, antimony, and arsenic.

34. The method of claim 33, wherein the step of providing the carbon foam is carried out by forming same from a precursor of resorcinol/formaldehyde, and wherein the step of doping is carried out using phosphoric acid.

35. The method of claim 33, wherein the step of providing the carbon foam is carried out by forming same from a precursor of polyacrylonitrile, and wherein the step of doping is carried out using a phosphoric acid/methanol solution.

* * * * *